United States Patent [19]

Joensuu

[11] Patent Number: 5,867,788
[45] Date of Patent: Feb. 2, 1999

[54] COVERTING A ROUTING ADDRESS WITHIN A TELECOMMUNICATIONS NETWORK

[75] Inventor: Erkki Joensuu, Plano, Tex.

[73] Assignee: Ericsson Inc., Research Park Triangle, N.C.

[21] Appl. No.: 656,713

[22] Filed: Jun. 3, 1996

[51] Int. Cl.[6] .............................. H04Q 7/22; H04M 1/00
[52] U.S. Cl. ........................ 455/445; 455/433; 455/435; 455/455; 379/220; 379/219
[58] Field of Search ..................... 455/436, 435, 455/432, 433, 445, 422, 414, 461, 426, 560; 379/219, 220, 229, 240, 230, 112

[56] References Cited

U.S. PATENT DOCUMENTS

| | | | |
|---|---|---|---|
| 5,210,787 | 5/1993 | Hayes et al. | 455/432 |
| 5,282,244 | 1/1994 | Fuller et al. | 379/230 |
| 5,396,543 | 3/1995 | Beeson, Jr. et al. | 455/560 |
| 5,420,916 | 5/1995 | Sekiguchi | 379/230 |
| 5,519,758 | 5/1996 | Tabbane | 455/433 |
| 5,610,974 | 3/1997 | Lantto | 455/433 |
| 5,625,670 | 4/1997 | Campana, Jr. et al. | 455/412 |
| 5,627,831 | 5/1997 | Azmak | 455/436 |
| 5,636,268 | 6/1997 | Dijkstra et al. | 379/220 |
| 5,646,985 | 7/1997 | Andruska et al. | 379/229 |
| 5,646,986 | 7/1997 | Emery et al. | 455/433 |
| 5,661,790 | 8/1997 | Hsu | 379/220 |
| 5,675,631 | 10/1997 | Kaminsky et al. | 379/89 |
| 5,689,554 | 11/1997 | Fukazawa | 379/229 |

FOREIGN PATENT DOCUMENTS

| | | |
|---|---|---|
| 2 280 085 | 1/1995 | United Kingdom . |
| WO 95/26114 | 9/1995 | WIPO . |
| WO 95/27382 | 10/1995 | WIPO . |

OTHER PUBLICATIONS

E.D. Sykas, et al., "Numbering and Addressing in IBCN for Mobile Communications," *Proceedings of the IEEE*, 79, No. 3, (Feb. 1991), pp. 230–241.

Y. Uchiyama, et al., "Network Functions and Signaling for Personal Roaming between Digital Cellular Standards," *International Conference on Universal Personal Communications*, (Nov. 1991), p. 451.

*Primary Examiner*—Dwayne D. Bost
*Assistant Examiner*—Jean A Gelin
*Attorney, Agent, or Firm*—Jenkens & Gilchrist

[57] ABSTRACT

An International Mobile Subscriber Identity (IMSI) number transmitted by a mobile station is first analyzed by the serving mobile switching center (MSC) associated with an International Telecommunication Union (ITU)-based SS7 network. If the received IMSI number instead belongs to an American National Standards Institute (ANSI)-based SS7 network, the serving MSC prepends a country code representing the mobile subscriber to the received IMSI number. The least significant digits of the resulting number are further truncated to conform to the E.214 standard (the maximum length of fifteen digits). A Mobile Application Part (MAP) based signal, such as a location update signal, is transmitted utilizing the generated E.214 number as the Signaling Connection Control Part (SCCP) called party number parameter and routed to an international gateway connecting the ITU-T based SS7 network with the ANSI based SS7 network. The international gateway deletes the country code prepended to the IMSI number from the received MAP signal and forwards the MAP signal to the destination node within the ANSI based SS7 network.

31 Claims, 7 Drawing Sheets

COVERTING A ROUTING ADDRESS WITHIN A TELECOMMUNICATIONS NETWORK

BACKGROUND OF THE INVENTION

1. Technical Field of the Invention

The present invention relates to a telecommunications network and, in particular, to the conversion of a routing address within a Signaling System No. 7 (SS7) signal.

2. Description of Related Art

Whenever a mobile station travels into a new Mobile Switching Center (MSC) coverage area or turns on its unit for the first time, the mobile station attempts to register with the serving MSC by transmitting an associated identification number known as the International Mobile Subscriber Identity (IMSI) number to the serving MSC. The serving MSC then communicates with the particular home location register (HLR) which stores subscriber information associated with the mobile station to inform the HLR of the mobile station's new location and to retrieve the requisite subscriber information from the HLR. Accordingly, the serving MSC, the HLR, and the connecting telecommunications network must have a mechanism for communicating signals between the serving MSC and the HLR. For example, North America and Europe each has its own particular addressing mechanism for communicating a signal between a particular MSC and an HLR within its own Signaling System No. 7 (SS7) network. However, there exist certain differences between these two addressing mechanisms which prevent an MSC located within one SS7 network to communicate with an HLR located within the other SS7 network.

North America currently follows the E.212 based addressing mechanism whereas Europe follows the E.214 based addressing mechanism. E.212 and E.214 are address formats and syntax enunciated by the International Telecommunication Union (ITU) for routing signals and data within a particular SS7 telecommunications network. One example of a system based on the E.212 addressing mechanism in the United States is the Personal Communications System (PCS) 1900 telecommunications network. On the other hand, an example of a system based on the E.214 addressing mechanism in Europe is the Global System for Mobile (GSM) telecommunications network. The PCS network uses the received IMSI number (E.212) from the mobile station to route a signal to an HLR within the North American Signaling System No. 7 (SS7) telecommunications network. In contrast, the GSM system modifies the received IMSI number to another number called Mobile Global Title (MGT, E.214) and uses the MGT number to route a signal to an HLR within the European SS7 telecommunications network.

Because one SS7 network does not contain translation data for handling the address number specified by the other SS7 network, the North America SS7 telecommunications network cannot currently route signals using the MGT number and the European SS7 telecommunications network similarly cannot route signals using the IMSI number. Consequently, when a mobile station associated with a United States service provider roams into an European country, there exists an incompatibility from a network signaling stand point. The serving MSC associated with the European SS7 telecommunications network cannot communicate a Mobile Application Part (MAP) based signal with the HLR located within the United States. Without performing the location update procedure, the HLR does not know where the mobile station is currently located and the serving MSC is not provided with the requisite subscriber information (e.g., billing information) for providing the requested mobile service to the roaming mobile station.

A number of proposals have been introduced to solve the above addressing incompatibility existing between the PCS and the GSM systems. One such proposal suggests changing the European SS7 telecommunications network to also route signals using the IMSI (E.212) number. Even though this proposal would establish global compatibility, all associated signal transfer points (STPs) and signal handling nodes within the European SS7 telecommunications network have to be modified at great costs and effort. Even if all the European countries could agree to make such modifications, this would be an enormous undertaking.

Accordingly, there is a need for a mechanism to enable the routing of MAP based signals from the European SS7 telecommunications network to the North American SS7 telecommunications network without mandating major changes or impacts on the existing networks.

SUMMARY OF THE INVENTION

The present invention discloses a method and apparatus for communicating a Mobile Application Part (MAP) based signal from a mobile switching center (MSC) associated with an International Telecommunication Union—Telecommunication (ITU-T) based Signaling System No. 7 (SS7) network to a home location register (HLR) associated with an American National Standards Institute (ANSI) based SS7 network. The serving MSC receives an International Mobile Subscriber Identity (IMSI) number from a mobile station currently roaming within the MSC coverage area. Instead of converting the received IMSI number formatted in accordance with the E.212 standard to a Mobile Global Title (MGT) number, the serving MSC prepends a country code associated with the ANSI based SS7 network to the received IMSI number. In order to format the resulting number to the length of fifteen (15) digits as mandated by the E.214 standard, the least significant digits of the resulting number are truncated. Utilizing the resulting E.214 number as the Signaling Connection Control Part (SCCP) Called Party Number (CdPn) parameter, the ITU-T based telecommunications network routes the signal to an international gateway connecting the ITU-T based telecommunications network with the ANSI based telecommunications network. After receiving the transmitted signal from the serving MSC, the international gateway removes the prepended country code from the called party number parameter and transmits the signal over the ITU-T based telecommunications network. Utilizing the truncated IMSI number, the ANSI based telecommunications network routes the MAP based signal to the HLR.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
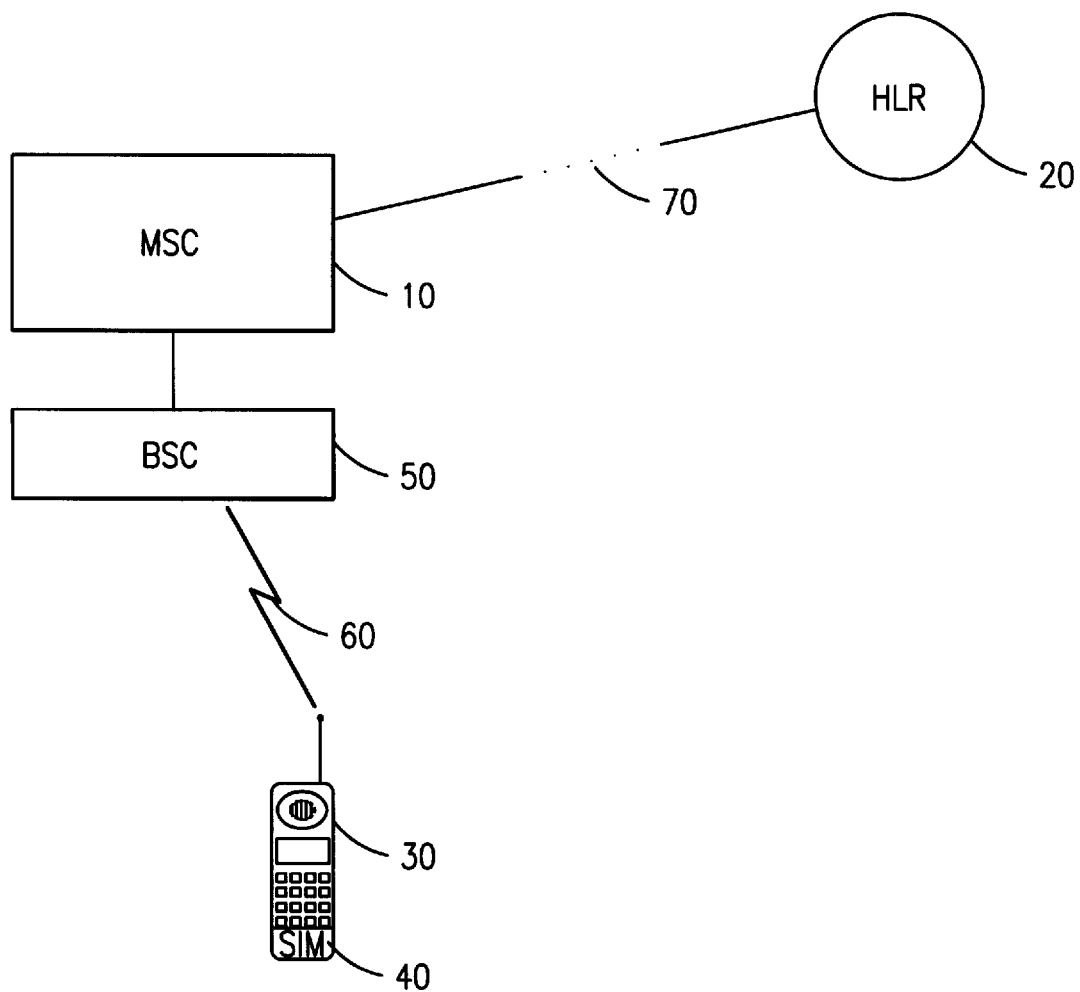
FIG. 1 is a block diagram illustrating a mobile switching center (MSC) communicating with a home location register (HLR) for registering a mobile station.

FIG. 1 is a block diagram of a general mobile network illustrating a mobile switching center (MSC) 10 communicating with a home location register (HLR) 20 for registering a mobile station 30. Whenever the mobile station 30 turns on its unit for the first time or roams into a new MSC coverage area, the mobile station 30 transmits the stored mobile station identification number to the serving MSC 10 via a base station controller (BSC) 50. The mobile station identification number is transmitted over a radio channel 60 to a base station connected to the BSC 50 and, in turn, to the serving MSC 10. In order to provide mobile service to the newly registering mobile station 30, the serving MSC 10 transmits a Mobile Application Part (MAP) based signal, such as a location update signal, to the HLR 20 via a signaling link 70. Such a signal informs the HLR 20 of the network address associated with the MSC 10 currently serving the mobile station 30 and also requests requisite subscriber information for providing mobile service to the roaming mobile station 30. The HLR 20 updates its database to store the network address representing the serving MSC 10 and also copies the requesting subscriber information to a visitor location register associated with the MSC 10 (VLR, not shown in FIG. 1 but usually co-located with the MSC 10). The network address representing the serving MSC 10 stored in the HLR 20 is later utilized by the mobile network to reroute an incoming call intended for the mobile station 30 to the serving MSC 10. Accordingly, whenever a telecommunications subscriber dials a directory number associated with the mobile station 30, known as the Mobile Station Integrated Service Digital Network (MSISDN) number, the HLR 20 is queried by the mobile network to determine the current location of the mobile station 30. Utilizing the stored network address representing the serving MSC 10, the HLR 20 requests a roaming number from the serving MSC 10 in response to the receipt of the query signal. The roaming number provided by the serving MSC 10 is then used by the telecommunications network to route the incoming signal towards the serving MSC 10. The serving MSC 10 then pages the mobile station 30 and accordingly establishes a speech connection with the mobile station 30.

With the introduction of the Global System for Mobile (GSM) communication and the Personal Communications System (PCS), a number of advanced subscriber features and applications are provided to mobile subscribers. One such feature is a SIM card 40 attachable to a mobile station 30. Using the SIM card 40, a mobile subscriber is able to store certain mobile subscriber information in a detachable memory unit and freely associate it with any available mobile station. Such information includes a mobile subscriber's MSISDN number and the IMSI number. By inserting the mobile subscriber's SIM card 40 into the mobile station 30, the stored subscriber information in the inserted SIM card 40 is available to the mobile subscriber's new terminal 30. As a result, the mobile subscriber is able to freely utilize any available mobile station while maintaining the same MSISDN number and subscriber feature data.

One example of such an SIM card application is international roaming. Since the PCS and the GSM utilize different frequencies for communicating with associated mobile stations, a PCS based mobile station utilizing the 1900 MHZ cannot be used within a GSM based European mobile network utilizing the 900 or 1800 MHZ. However, by inserting an SIM card associated with an United States service provider into a GSM based European mobile station, the mobile subscriber from the United States can still request mobile service from an European service provider.

Whenever a PCS mobile subscriber attaches his or her SIM card into a GSM based mobile station, the serving MSC 10 within the European mobile network has to perform the above described location update with the HLR 20 located within the United States. However, because of the differences in the Signaling Control Connection Part (SCCP) addressing mechanism existing between the two networks, the serving MSC 10 associated with the ITU-T based (European) telecommunications network is currently not able to communicate a MAP based signal with the HLR 20 associated with the ANSI based (North America) telecommunications network.

Figure 2:
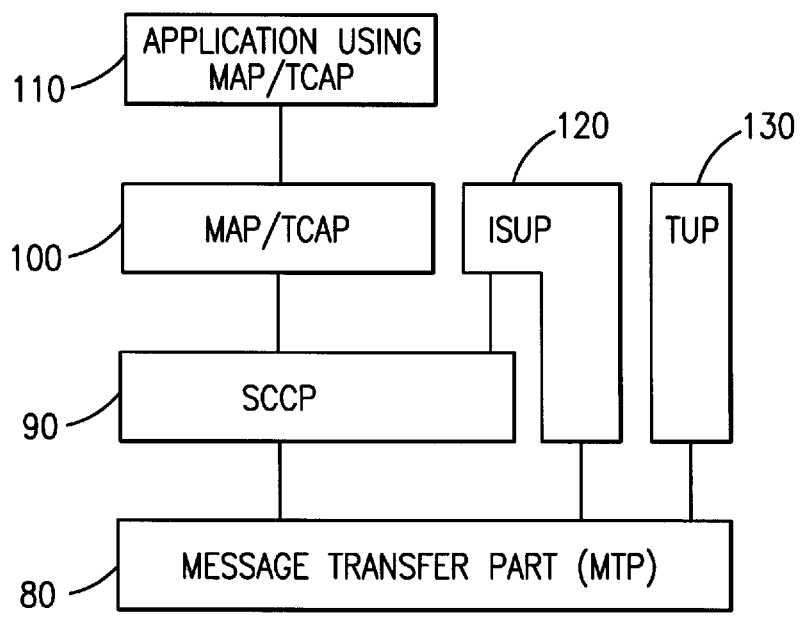
FIG. 2 is a block diagram illustrating the different layers within the Signaling System No. 7 (SS7) telecommunications system.

FIG. 2 is a block diagram illustrating the different layers within a typical Signaling System No. 7 (SS7) telecommunications system. In accordance with the layer architecture of the Open System Interface (OSI), an SS7 telecommunications system is also layered into multiple system layers. Basically, SS7 has two parts, a user part and a message transfer part. The message transfer part (MTP) 80 is the lowest layer of the SS7 network system and is used to transport data physically from one point to another point in the network. The user part comes in several varieties. Examples of such user parts include a Telephone Under Part (TUP) 130 for basic telephone service, and an Integrated Service Digital Network (ISDN) User Part (ISUP) 120 for combined voice, data and voice services. These user parts also utilize the MTP 80 to provide a connection-less but sequenced transport service. Applications 110 residing at the very highest layer of an SS7 network utilize the Transaction Capabilities Application Part (TCAP) layer 100, and the Signaling Connection Control Part (SCCP) layer 90 to transport application layer data from one application to another application via the MTP 80. Applications can further utilize their own proprietary message signals, such as a Mobile Application Part (MAP) based signal, to interface directly with the SCCP layer 90 to communicate application layer data from one application to another application. An illustration of such communication includes the communication of a MAP based location update signal from an MSC to an HLR.

The purpose of the SCCP 90 is to provide the means for end-to-end routing. Accordingly, the SCCP 90 processes the specified address within a particular signal to properly deliver the data to the specified destination. This addressing information is used at each signaling point, such as a Signaling Transfer Point (STP), by the MTP 80 to determine which communication link to use.

Figure 3:
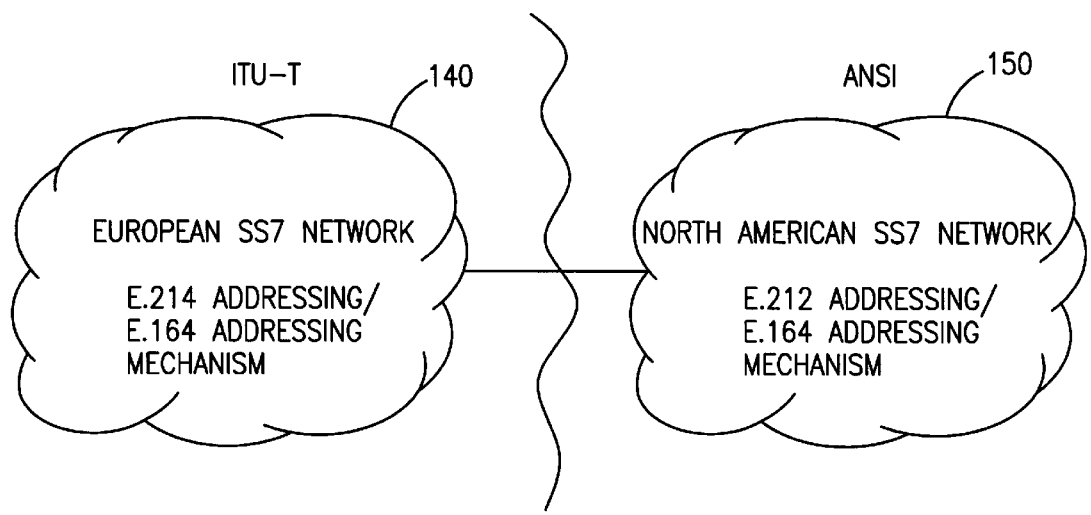
FIG. 3 is a diagram illustrating the different addressing mechanisms utilized by the International Telecommunication Union—Telecommunication (ITU-T) based SS7 network and the American National Standards Institute (ANSI) based SS7 network.

FIG. 3 is a diagram illustrating the different addressing mechanisms utilized by the International Telecommunications Union—Telecommunication (ITU-T) based SS7 network 140 and the American National Standards Institute (ANSI) based SS7 network 150. North America, which is ANSI based, currently follows the E.212 and E.164 based SCCP addressing mechanism. Europe, which is ITU-T based, instead follows the E.214 and E.164 SCCP addressing mechanism. E.212 and E.214 are address formats and syntax enunciated by the International Telecommunication Union (ITU) for routing signals and data within a particular SS7 telecommunication network. Each participating Signaling Transfer Point (STP) within a particular SS7 network contains translation data recognizing the received called party address in order to properly deliver the received signal to the final destination. However, because the ITU-T based SS7 network does not contain translation data for handling the E.212 formatted address, it is currently not possible for an MSC within the ITU-T based SS7 network 140 to communicate a MAP based signal to an HLR within the ANSI based SS7 network 150.

Whenever a mobile station turns on its unit for the first time or roams into a new MSC coverage area, the associated IMSI number in accordance with the E.212 standard is transmitted to the serving MSC. Within North America, the serving MSC receives the E.212 number (IMSI) and uses it directly to communicate with the HLR. On the other hand, within Europe, the serving MSC modifies the received E.212 number (IMSI) and generates another number in accordance with the E.214 number. Newly generated E.214 number, known as a Mobile Global Title (MGT) number, is then used by the MSC to communicate with the HLR within the ITU-T based SS7 network.

Figure 4:
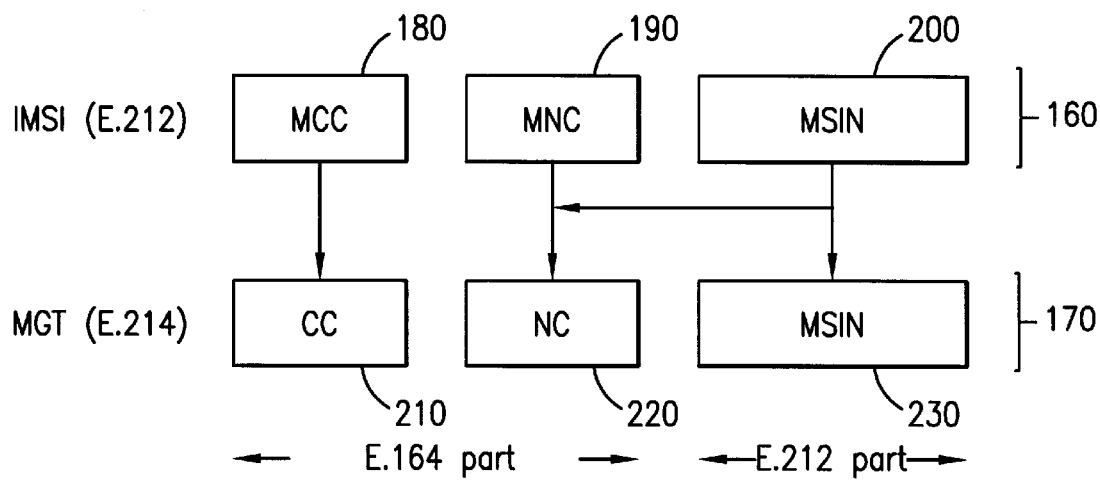
FIG. 4 is a diagram illustrating the conversion of an International Mobile Subscriber Identity (IMSI) number to a Mobile Global Title (MGT) number by an ITU-T based MSC.

Now referring to FIG. 4, a diagram illustrating the conversion of an E.212 based IMSI number 160 to an E.214 based Mobile Global Title (MGT) number by the serving MSC associated with the ITU-T based SS7 network is shown. Whenever a mobile stations registers with a new MSC by transmitting its IMSI number 160, the serving MSC modifies the received IMSI number into an E.214 number known as the MGT number 170. The received IMSI number 160 is basically comprised of three parts: mobile country code (MCC, 3 digits) 180, mobile network code (MNC, 2 digits) 190 and a mobile subscriber identification number (MSIN, maximum 10 digits) 200. The ITU-T based MSC converts the received IMSI number 160 into an E.214 based MGT number by converting the MCC 180 to a corresponding country code (CC) 210 and the MNC 190 to a corresponding network code (NC) 220. The MSIN 200 remains the same for the E.214 based MGT number. This translation from the E.212 number to the E.214 based MGT number is possible within the ITU-T based SS7 telecommunications network because there is a unique one-to-one mapping between the two numbers. This is because there is only one service provider associated with a particular network code (NC) within the European telecommunications network. However, no such one-to-one mapping exists for the North American telecommunications network and, thus, no analogous conversion from an IMSI number to a compatible MGT number is possible.

Figure 5:
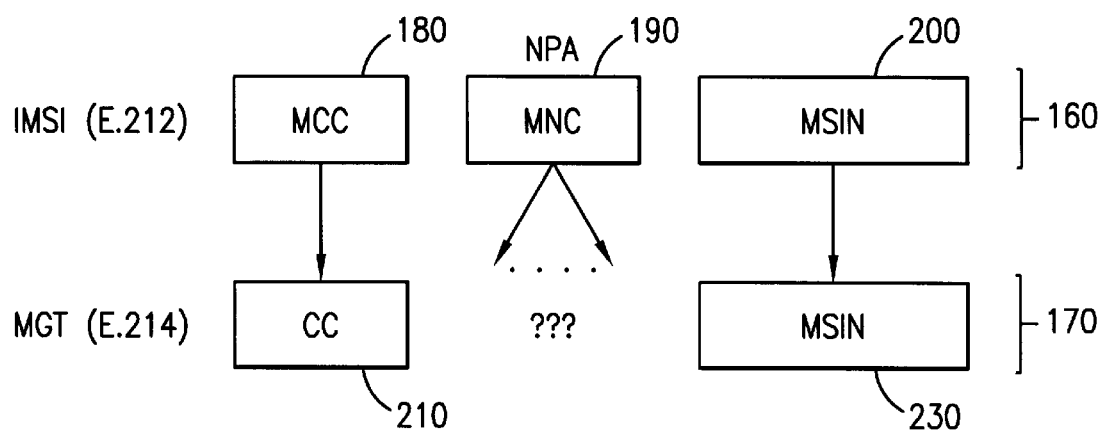
FIG. 5 is a diagram illustrating a problem existing when converting an ANSI associated IMSI to a MGT number by an ITU-T based MSC.

Reference is now made to FIG. 5 where a diagram illustrating a conversion problem existing while modifying an ANSI based IMSI number to a MGT number by the ITU-T based serving MSC is shown. Since the country code 210 and the MSIN 230 are unique to each mobile station and its associated country, there is no problem in converting the MCC 180 and the MSIN 200 to the corresponding CC 210 and MSIN 230 for the E.214 based MGT number. However, since the MNC 190 is analogous to a Numbering Plan Area (more commonly known as an Area Code) within North America, currently there exists no one-to-one mapping between a particular MNC 190 and a NC 230 for an ANSI based IMSI. This is because, within North America, and especially within the United States, there are usually more than one network provider within a particular NPA. Since each network provider is assigned an unique network code, just by analyzing the MNC number 190, the serving ITU-T based MSC is not able to convert the MNC number 290 to the corresponding NC associated with the roaming mobile subscriber. Because of such a conversion problem, a mobile subscriber from the United States cannot insert his or her SIM card into a GSM based mobile station and request international roaming from an European mobile service provider.

Figure 6:
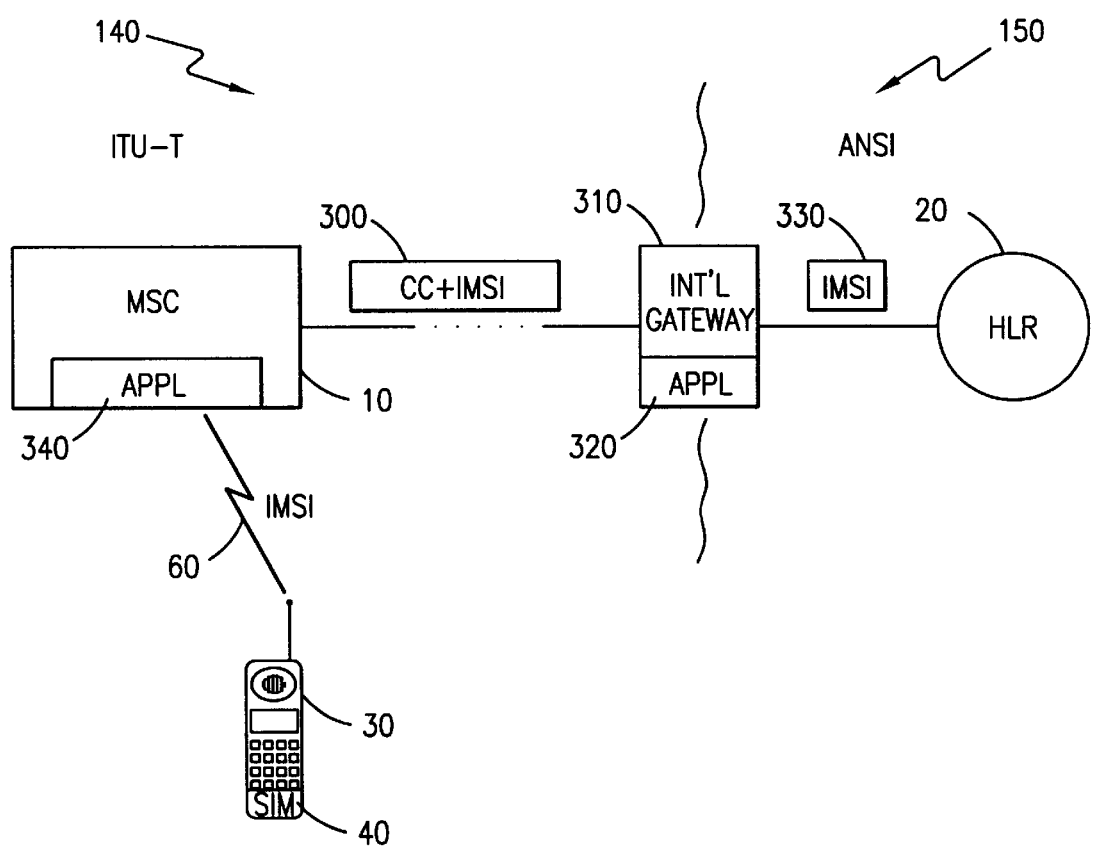
FIG. 6 is a diagram illustrating the communication of a Mobile Application Part (MAP) based signal from an ITU-T based MSC to an ANSI based HLR.

FIG. 6 is a diagram illustrating the communication of a MAP based signal from an ITU-T based MSC 10 to an ANSI based HLR 20 in accordance with the teachings of the present invention. Whenever a mobile subscriber from the ANSI based country, such as the United States, inserts his or her SIM card 40 into an ITU-T based mobile station 30, the mobile station 30 retrieves the stored IMSI number from the attached SIM card 40 and transmits it to the serving MSC 10 via a radio link 60. The serving MSC 10 then attempts to perform a location update procedure with the mobile's HLR 20 for informing the HLR 20 of the current mobile station location and also for retrieving the requisite subscriber information from the HLR 20. By analyzing the first three digits of the received IMSI number, the serving MSC 10 determines that the mobile subscriber is associated with an ANSI based country. As a result, instead of converting the received E.212 based IMSI number to an E.214 based MGT number as described above, an application module 340 within the serving MSC 10 prepends the corresponding country code (CC) with the received IMSI number creating a new E.214 based number. The prepended CC number is in accordance with the World Plan Committee 1988 proposal as specified by the E.164 recommendation. For example, the United States is assigned the CC value of one (1) (See attachment A). The generated E.214 number is then utilized by the ITU-T based SS7 network 140 to route the MAP based location update signal to the international gateway 310 connecting the ITU-T based SS7 network 140 with the ANSI based SS7 network 150. Therefore, the generated E.214 number is utilized as the SCCP called party number (CdPn) parameter to deliver an application layer signal to the final destination. Each participating STPs associated with the ITU-T based SS7 network 140 receives the MAP signal, analyzes the prepended CC, and forwards to an International Gateway 310 connected to the ANSI based SS7 network 150. Since every European county does not have an international gateway connection to North America, each participating country routes the MAP based signal to a neighboring country until a country with an international gateway connection to North America is found.

When the MAP based signal is received by the international gateway 310, an application module 320 within the international gateway 310 removes the CC from the IMSI number, specifies the translation type (TT) as nine (9) to indicate that the routing should be performed using the specified E.212 number.

In addition to the removal of the CC from the received SCCP called party number parameter, additional modifications to the formats and syntax of the received SCCP parameters have to be performed. Since the ANSI based SCCP parameters have different data structures and parameter labels than the ITU-T based SCCP parameters, the international gateway 310 must reformat and convert the received ITU-T based SCCP parameters into recognizable ANSI based SCCP parameters. A full description of such reformatting and conversion procedures is disclosed in U.S. Application for Patent, Ser. No. 08/630355, filed Apr. 10, 1996, entitled "A Network Protocol Conversion Module Within A Telecommunications System" hereby incorporated by reference herein (hereinafter referred to as the Lindquist application).

Figure 7:
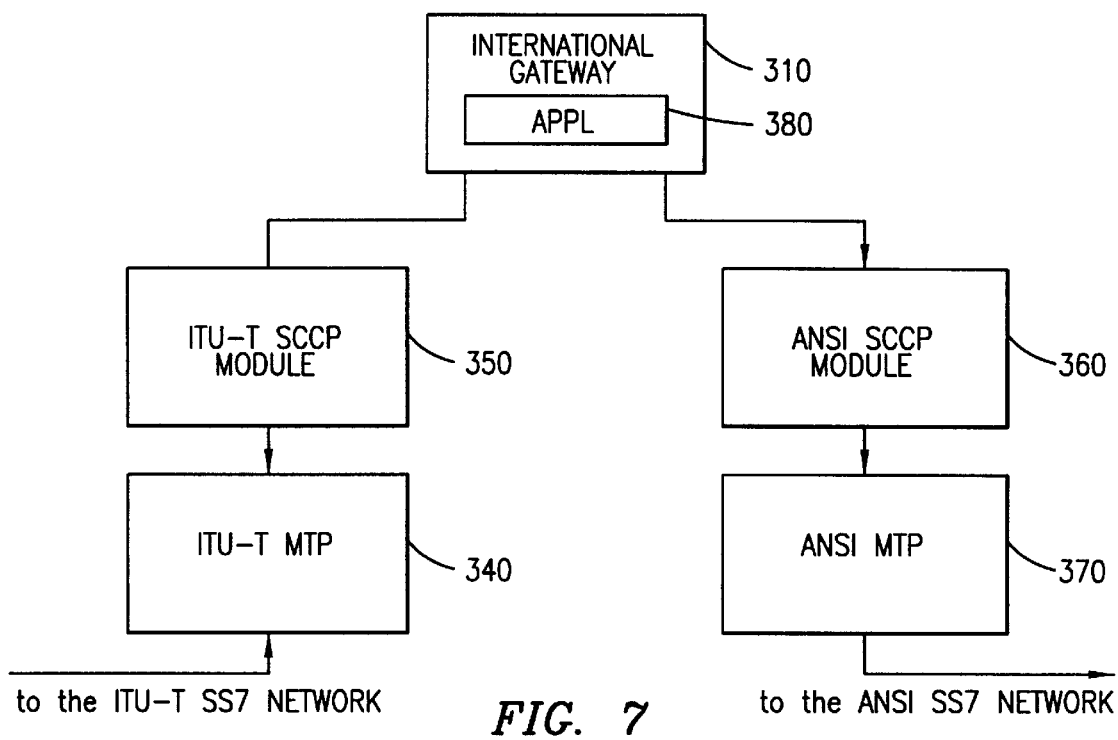
FIG. 7 is a block diagram illustrating a conversion module interfacing with Signaling Connection Control Part (SCCP) modules for converting the called party address within a signal communicated between an ITU-T based SS7 network and an ANSI based SS7 network.

Accordingly, reference is now made to FIG. 7 illustrating a conversion module interfacing with SCCP modules for converting the called party address within the MAP signal communicated between an ITU-T based SS7 network and an ANSI based SS7 network. The ITU-T based MTP 340 physically transports the application layer signal from the ITU-T based SS7 network and interfaces with the ITU-T based SCCP module 350. The ITU-T based SCCP module 350 retrieves the signal from the ITU-T based MTP layer 340 and forwards it to the conversion application 380 within the international gateway 310. The conversion application 380, in response to the dynamic values stored in its conversion table or register and as fully disclosed in the Lindquist application, changes the received ITU-T based SCCP parameters to the corresponding ANSI based SCCP parameters. The signal with the converted ANSI based SCCP parameters and still containing the same application layer data is then transmitted to the ANSI based SS7 network to be delivered to the destination application node (i.e., HLR). Accordingly, the converted signal is interfaced with the ANSI based SS7 network SCCP module 360. The ANSI based SCCP module 360, in turn, interfaces the signal with the ANSI based MTP layer 370 for physical transportation to the destination node.

During the overall conversion and interface process, only the SCCP layer data within the signal header are manipulated by the conversion module, and all other layer data, including application layer data, are transported transparently through the international gateway 310.

Figure 8:
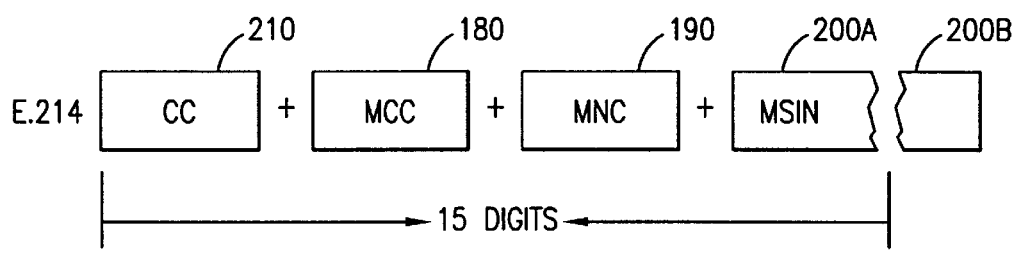
FIG. 8 is a diagram illustrating the prepending of a country code to the received IMSI and truncating the least significant digits of the resulting number to conform to the E.214 standard.

Reference is now made to FIG. 8 where a diagram illustrating the prepending of a country code to the received IMSI number to generate an E.214 number and the truncation of the least significant digits of the generated E.214 number to conform to the E.214 standard is shown. The adding of a country code 210 with the maximum length of three (3) to the existing IMSI with the length of fifteen (15) digits results in an E.214 number with the total length of eighteen (18) which violates the maximum fifteen digit (15) requirement mandated by the E.214 standard is generated. In accordance with the teachings of the present invention, the least significant digits of the newly generated E.214 number are truncated so that the length of the resulting E.214 number conforms to the E.214 standard. Accordingly, depending on the length of the CC prepended to the received IMSI number, up to three least significant digits of the resulting E.214 number can be truncated as shown in 200B. The remaining portions of the IMSI number 200A are later utilized by the ANSI based SS7 network to determine the HLR currently storing the requisite subscriber information. The MCC 180 and the MNC 190 are concatenated without modification to the CC 210.

Even without the complete IMSI number, it is still possible to route a MAP based signal to an HLR within the ANSI based SS7 network. Because a series of IMSI numbers are assigned to a particular HLR, by analyzing the first 12 digits of a particular IMSI number, the ANSI based SS7 network is able to determine the corresponding country, the network provider, and a particular HLR within that network provider. Once the MAP signal is delivered to a particular HLR, the HLR determines the particular mobile subscriber by analyzing the full IMSI number stored as part of the application data. Since application data transmitted by the serving MSC are not altered by the international gateway during the conversion, the HLR has access to the full IMSI number for determining the correct identity of the roaming mobile subscriber.

Figure 9:
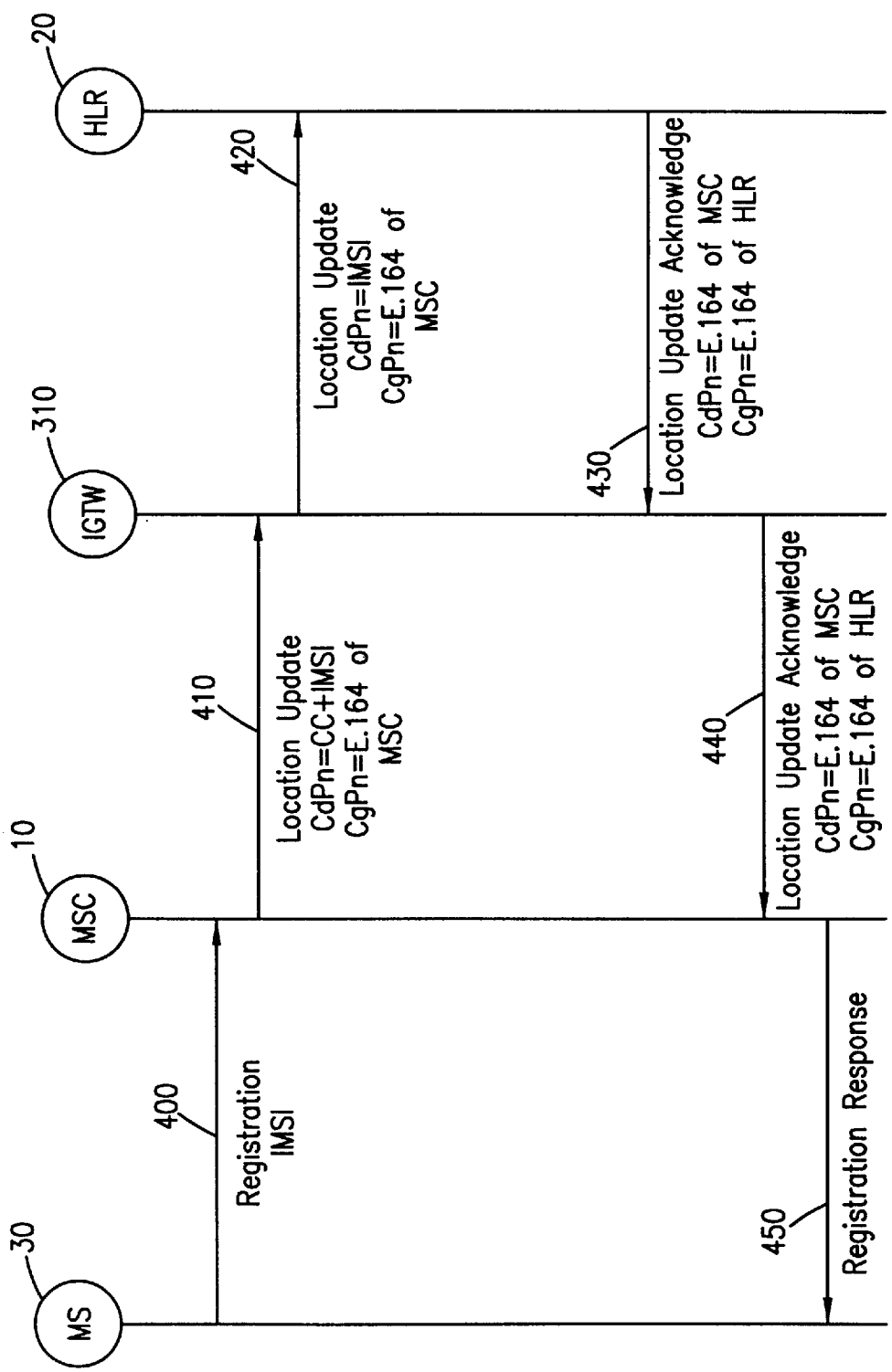
FIG. 9 is a signal sequence diagram illustrating the communication of a signal between a mobile station and a home location register (HLR).

FIG. 9 is a signal sequence diagram illustrating the communication of a MAP based signal between an MSC 10 and an HLR 20. As described above, whenever a mobile station 30 roams into a new MSC coverage area, the mobile station 30 attempts to register with the new MSC 10 by transmitting its IMSI number formatted in accordance with the E.212 standard to the serving MSC 10 via a signal link 400. Upon recognizing that the receiving IMSI belongs to an ANSI based country, the serving MSC 10 prepends a corresponding CC as specified by the E.164 recommendation with the received IMSI number. The least significant digits of the resulting number are further truncated to conform to the E.214 standard. The generated E.214 number is then utilized by the serving MSC 10 to transmit a MAP based signal, such as a location update signal, to the HLR 20. The generated E.214 number is utilized as the called party number within the SCCP parameter for the transmitted signal as illustrated by a signal link 410. In order to facilitate the proper delivery of a return signal, an E.164 number representing the serving MSC 10 is further included as the Calling Party Number. The transmitted MAP signal is then routed to the international gateway 310 connecting the ITU-T based SS7 network with the ANSI based SS7 network. In accordance with the teachings of the present invention, the international gateway 310 deletes the CC from the received E.214 number, reformats the received ITU-T based SCCP parameters to conform to the ANSI standard, and transmits the converted signal over the ANSI based SS7 network via a signal link 420. The calling party number specified in the E.164 standard is unmodified by the international gateway 310. The MAP signal is then properly routed over the ANSI based SS7 network to the HLR 20. After performing the location update procedure, the HLR 20 transmits a return signal back to the serving MSC 10 by utilizing the received calling party number as the called party number. Since an address based on E.164 standard is routeable on both ANSI and ITU-T based networks, the signal is routed to the serving MSC 10 without further modification (signal links 430 and 440). The E.164 number representing the HLR 20 is further included as the calling party number for the return signal to facilitate direct communication of subsequent signals from the serving MSC 10 to the HLR 20. After receiving the return signal, such as a location update acknowledge signal, the serving MSC 20 informs the mobile station 30 of the successful registration (signal link 450), and mobile service is accordingly provided.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for transmitting a signal from a first Signaling System No. 7 (SS7) network to a second SS7 network wherein said first SS7 network and said second SS7 network use an incompatible addressing mechanism, said method comprising the steps of:

receiving at said first SS7 network a mobile subscriber identification number from a mobile station associated with a home location register (HLR) for storing subscriber information related to said mobile station and wherein said HLR is located within said second SS7 network;

prepending a particular country code associated with said second SS7 network with said mobile subscriber identification number received at said first SS7 network; and transmitting a SS7 signal from said first SS7 network to said HLR within said second SS7 network using said prepended country code with said received mobile subscriber identification number as a routing address.

2. The method of claim 1 further comprising the steps of:

receiving said transmitted SS7 signal at an international gateway connecting said first SS7 network with said second SS7 network;

stripping away from said received SS7 signal said country code prepended to said mobile subscriber identification number; and transmitting said SS7 signal with said mobile subscriber identification number as said routing address over said second SS7 network.

3. The method of claim 1 wherein said mobile subscriber identification number comprises an International Mobile Subscriber Identity (IMSI) number.

4. The method of claim 1 wherein said SS7 signal comprises a Mobile Application Part (MAP) signal.

5. The method of claim 1 wherein said prepended country code comprises a Country Code specified in accordance with the E.164 recommendation.

6. The method of claim 1 wherein said step of transmitting said SS7 signal from said first SS7 network to said second SS7 network further comprises the step of transmitting said SS7 signal with said country code prepended to said mobile subscriber identification number as a Signaling Connection Control Part (SCCP) called party number parameter.

7. The method of claim 6 wherein said step of prepending further comprises the step of truncating the least significant digits of said country code prepended to said mobile subscriber identification number to conform the length thereof to fifteen (15) digits in accordance with the E.214 standard.

8. The method of claim 1 wherein said first SS7 network comprises an International Telecommunication Union—Telecommunication (ITU-T) based SS7 network.

9. The method of claim 1 wherein said second SS7 network comprises an American National Standards Institute (ANSI) based SS7 network.

10. A system for communicating a signal from a first Signaling System No. 7 (SS7) network to a second SS7 network, said system comprising:

a mobile station having a mobile subscriber identification number, said mobile station originally associated with said second SS7 network and currently roaming within said first SS7 network;

a telecommunications node within said first SS7 network for providing mobile service to said mobile station, said telecommunications node receiving said mobile subscriber identification number from said mobile station;

a first application module associated with said telecommunications node for prepending a routing number associated with said second SS7 network with said received mobile subscriber identification number; and wherein said telecommunications node transmits a SS7 signal using said prepended routing number with said mobile subscriber identification number as a called party number.

11. The system of claim 10 further comprising:

a gateway connecting said first SS7 network to said second SS7 network, said international gateway receiving said transmitted SS7 signal from said first SS7 network; and wherein said international gateway further comprises a second application module for removing said routing number from said received called party number and transmitting said SS7 signal over said second SS7 network.

12. The system of claim 10 wherein said telecommunications node comprises a Mobile Switching Center (MSC) serving said mobile station.

13. The system of claim 10 wherein said mobile subscriber identification number comprises an International Mobile Subscriber Identity (IMSI) number.

14. The system of claim 10 wherein said first SS7 network routes said SS7 signal using a Mobile Global Title (MGT) based on the E.214 standard.

15. The system of claim 10 wherein said second SS7 network routes said SS7 signal using an International Mobile Subscriber Identity (IMSI) number based on the E.212 standard.

16. The system of claim 10 wherein said routing number associated with said second SS7 network comprises a country code.

17. The system of claim 16 wherein said country code comprises a country code specified in accordance with the E.164 recommendation.

18. The system of claim 10 wherein said SS7 signal comprises a Mobile Application Part (MAP) signal.

19. The system of claim 10 wherein said first SS7 network comprises an International Telecommunication Union—Telecommunication (ITU-T) based SS7 network.

20. The system of claim 10 wherein said second SS7 network comprises an American National Standards Institute (ANSI) based SS7 network.

21. The system of claim 10 wherein said first application module truncates the least significant digits of said routing number prepended to said mobile subscriber identification number to the length of fifteen (15) digits to conform to the E.214 standard.

22. A method for communicating a signal from a first telecommunications node within a first Signaling System No. 7 (SS7) network to a second telecommunications node within a second SS7 network, said method comprising the steps of:

receiving an identification number associated with a particular mobile station at said first telecommunications node;

determining a routing number representing said second SS7 network;

transmitting a SS7 signal with said routing number and said identification number over said first SS7 network to said second SS7 network;

receiving said transmitted SS7 signal at a gateway connecting said first SS7 network with said second SS7 network;

removing said routing number from said received SS7 signal; and transmitting said SS7 signal with said identification number to said second telecommunications node over said second SS7 network.

23. The method of claim 22 wherein said identification number comprises an International Mobile Subscriber Identity (IMSI) number.

24. The method of claim 22 wherein said first telecommunications node comprises a Mobile Switching Center (MSC) serving said mobile station.

25. A method for communicating a signal from a first telecommunications node within a first Signaling System No. 7 (SS7) network to a second telecommunications node within a second SS7 network, said method comprising the steps of:

receiving an identification number associated with a particular mobile station at said first telecommunications node;

determining a routing number representing said second SS7 network wherein said routing number comprises a country code specified in accordance with the E.164 recommendation; and transmitting a SS7 signal with said routing number and said identification number over said first SS7 network to said second SS7 network.

26. A method for communicating a signal from a first telecommunications node within a first Signaling System No. 7 (SS7) network to a second telecommunications node within a second SS7 network, said method comprising the steps of:

receiving an identification number associated with a particular mobile station at said first telecommunications node;

determining a routing number representing said second SS7 network; and transmitting a SS7 signal with said routing number and said identification number over said first SS7 network to said second SS7 network, wherein said step of transmitting said SS7 signal with said routing number and said identification number comprises the steps of:

prepending said routing number with said identification number; and transmitting said SS7 signal with said routing number prepended to said identification number as a called party number.

27. The method of claim 26 wherein said step of prepending further comprises the step of truncating the least significant digits of said routing number prepended to said identification number to the length of fifteen (15) to conform to the E.214 standard.

28. The method of claim 22 wherein said second telecommunications node comprises a home location register (HLR) for storing subscriber information related to a mobile subscriber associated with said mobile station.

29. The method of claim 22 wherein said step of determining said routing number representing said second SS7 network further comprises the step of recognizing that said mobile station is not associated with said first SS7 network.

30. The method of claim 22 wherein said first SS7 network comprises an International Telecommunication Union—Telecommunication (ITU-T) based SS7 network.

31. The method of claim 22 wherein said second SS7 network comprises an American National Standards Institute (ANSI) based SS7 network.

* * * * *

UNITED STATES PATENT AND TRADEMARK OFFICE
CERTIFICATE OF CORRECTION

PATENT NO.    : 5,867,788
DATED         : Feb. 2, 1999
INVENTOR(S)   : Joensuu

It is certified that error appears in the above-identified patent and that said Letters Patent is hereby corrected as shown below:

On the title page, item [54] and column 1, line 1, replace "COVERTING" with --CONVERTING--

Column 2, line 49          Replace "ITU-T"
                               With --ANSI--

Signed and Sealed this

Twenty-eighth Day of September, 1999

*Attest:*

Q. TODD DICKINSON

*Attesting Officer*          *Acting Commissioner of Patents and Trademarks*